(No Model.)
F. STRAUSS.
AXLE BEARING.
No. 400,142. Patented Mar. 26, 1889.
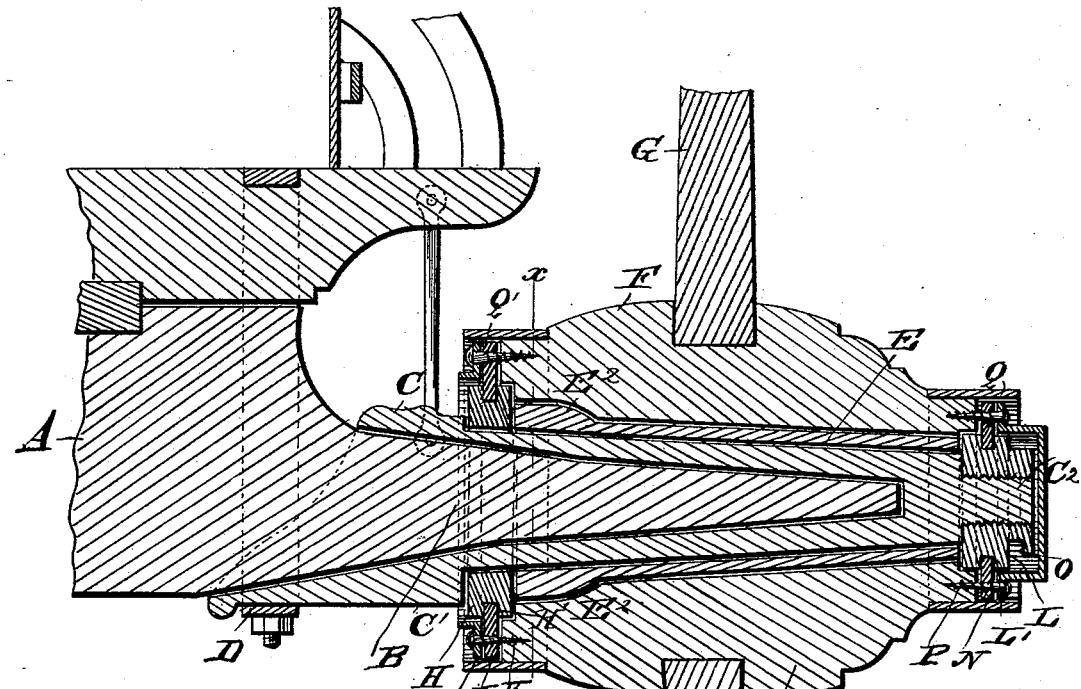
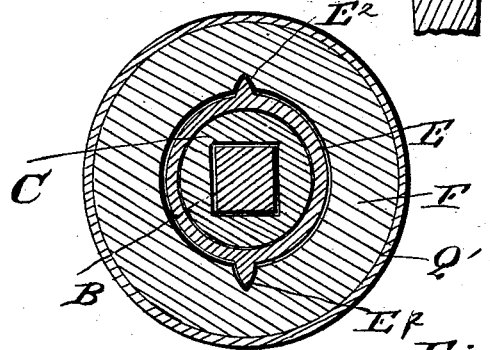
WITNESSES:
Phil. C. Dieterich.
C. Sedgwick.
INVENTOR.
F. Strauss
BY Munn & Co.
ATTORNEYS.

United States Patent Office.

FRIDRICH STRAUSS, OF LA CROSSE, WISCONSIN.

AXLE-BEARING.

SPECIFICATION forming part of Letters Patent No. 400,142, dated March 26, 1889.

Application filed January 12, 1889. Serial No. 296,201. (No model.)

*To all whom it may concern:*

Be it known that I, FRIDRICH STRAUSS, of La Crosse, in the county of La Crosse and State of Wisconsin, have invented a new and Improved Axle-Bearing, of which the following is a full, clear, and exact description.

The object of the invention is to provide a new and improved axle-bearing for wagons, which is very simple and durable in construction, very effective in operation, and prevents any dust or grit from passing to the inside of the journal.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a transverse section of the same on the line $x\,x$ of Fig. 1. Fig. 3 is a sectional side elevation of the journal.

The improved axle-bearing is provided with the usual axle, A, carrying on each end a projection, B, made tapering longitudinally and square in cross-section, as illustrated in Figs. 1 and 2, and fitting into a correspondingly-shaped aperture formed centrally in the skein C, fastened by a clip, D, or other suitable means to the axle, as shown in Fig. 1. On the skein is mounted to turn in the usual manner the journal E, provided on its inside with diagonal channels E', intersecting each other, as shown in Fig. 3, and serving to carry the oil or other lubricant throughout the entire length of the journal. On the inner end of the journal E are formed the usual lugs, $E^2$, driven into the hub F of the wheel G, as illustrated in Fig. 2. On the inner end of the skein C is formed a shoulder, C', against which rests a collar, H, secured on the skein, and provided in its rim with an annular groove, H', into which fits loosely a rubber washer, I, resting against the inner face of the hub F, and connected by means of screws K to the said hub F. In front of the washer I is also secured, by means of set-screws, a metallic cap, J, which protects the rubber from wear. On the outer end of the skein C is formed a threaded offset, $C^2$, onto which screws a nut L, made circular near its inner end and abutting against the ends of the journal E and the said skein. An annular groove, L', is formed in the circular part of the nut L, and into it fits loosely a rubber washer, N, onto which is fitted a cap, O, secured by screws P, which also pass through the rubber washer to the outer face of the hub F. The cap O covers up the rubber washer N, as well as the nut L, and the edges of the said rubber and the cap are covered by a band, Q, fastened to the hub F. A similar band, Q', is secured to the inner end of the hub F to protect the edges of the cap J and the rubber washer I. It will be seen that the rubber washers, by extending into the collar H and the nut L, prevent dust and grit from passing to the journal E and the skein C, thereby keeping the lubricant contained between the two in good condition and avoiding the grinding of the journal and the skein.

Having thus fully described my invention, I claim as new and desire to secure by Letters Patent—

1. In an axle-bearing, the combination, with a skein provided near its inner end with a shoulder, of a collar held on the said skein near the said shoulder, and provided with an annular groove, a rubber washer fitting into the said groove, and a hub to which the said rubber washer is fastened and carrying the journal turning on the skein, substantially as shown and described.

2. In an axle-bearing, the combination, with a skein provided near its outer end with a reduced screw-threaded extension, of a nut screwing on the said threaded extension and provided with an annular groove, a rubber washer fitting into the said annular groove, and a hub on which is secured said rubber washer, the said hub being mounted to rotate on the said skein, substantially as shown and described.

3. In an axle-bearing, the combination, with a skein provided near its outer end with a reduced screw-threaded extension, of a nut screwing on the said threaded extension and provided with an annular groove, a rubber washer fitting into the said annular groove, a hub on which said rubber washer is secured, said hub being mounted to rotate on the said skein, and a cap secured on the outside of the said rubber washer, substantially as shown and described.

4. In an axle-bearing, the combination, with a skein provided on its inner end with a shoulder and on its outer end with a screw-threaded extension, of a journal held to rotate on the said skein, a hub secured on the said journal, a collar held on the said skein between the said shoulder and the inner end of the said journal, said collar being provided with an annular groove in its rim, a rubber washer held in the said annular groove and secured to the said hub, a nut screwing on the threaded extension of the said skein, and also provided with an annular groove, and a second rubber washer fitted in the said annular groove and secured to the outer face of the said hub, substantially as shown and described.

5. In an axle-bearing, the combination, with a skein provided on its inner end with a shoulder and on its outer end with a screw-threaded extension, of a journal held to rotate on the said skein, a hub secured on the said journal, a collar held on the said skein between the said shoulder and the inner end of the said journal, said collar being provided with an annular groove in its rim, a rubber washer held in the said annular groove and secured to the said hub, a nut screwing on the threaded extension of the said skein, and also provided with an annular groove, a second rubber washer fitted in the said annular groove and secured to the outer face of the said hub, and caps fastened to the outside of the said rubber washers, substantially as shown and described.

FRIDRICH STRAUSS.

Witnesses:
HERMANN RISTOW,
GEORG G. WEIHAUPT.